(12) United States Patent
Thakur et al.

(10) Patent No.: US 6,623,538 B2
(45) Date of Patent: Sep. 23, 2003

(54) STERILE LAMINAR AIRFLOW DEVICE

(75) Inventors: Rajesh Thakur, Palampur (IN); Anil Sood, Palampur (IN); Paramvir Singh Ahuja, Palampur (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 09/884,603

(22) Filed: Jun. 19, 2001

(65) Prior Publication Data

US 2002/0121196 A1 Sep. 5, 2002

Related U.S. Application Data

(60) Provisional application No. 60/273,653, filed on Mar. 5, 2001.

(51) Int. Cl.[7] .......................... B01D 46/00; B08B 15/02
(52) U.S. Cl. .......................... 55/385.2; 55/356; 55/357; 55/358; 55/467; 55/472; 55/473; 55/482; 55/501; 55/502; 55/DIG. 18; 96/224; 96/414; 96/417; 96/421; 454/57; 454/60; 454/63; 454/66; 454/187; 454/188; 454/189; 454/193
(58) Field of Search .......................... 55/385.1, 385.2, 55/467, 472, 473, 482, DIG. 18, DIG. 29, 356, 357, 358, 501, 502; 96/224, 414, 417, 421; 454/57, 60, 63, 66, 187, 188, 189, 193

(56) References Cited

U.S. PATENT DOCUMENTS

| | | | | |
|---|---|---|---|---|
| 2,709,954 A | * | 6/1955 | Baker ................... | 55/DIG. 18 |
| 2,715,359 A | * | 8/1955 | Mackintosh et al. ... | 55/DIG. 18 |
| 3,301,167 A | * | 1/1967 | Howard et al. ........ | 55/DIG. 18 |
| 3,336,855 A | * | 8/1967 | Messina ................ | 55/DIG. 29 |
| 3,494,112 A | * | 2/1970 | Deckas ................. | 55/DIG. 18 |
| 3,616,624 A | * | 11/1971 | Marsh ................... | 55/DIG. 18 |
| 3,651,659 A | * | 3/1972 | Nakao et al. ......... | 55/467 |
| 3,729,905 A | * | 5/1973 | Diccianni ............. | 55/DIG. 18 |
| 3,811,250 A | * | 5/1974 | Fowler, Jr. ............ | 55/473 |
| 4,142,458 A | * | 3/1979 | Duym ................... | 55/DIG. 18 |
| 4,150,606 A | * | 4/1979 | Nelson .................. | 55/DIG. 18 |
| 4,249,463 A | * | 2/1981 | Hornby ................. | 55/DIG. 18 |
| 4,557,184 A | * | 12/1985 | Orii et al. ............. | 55/DIG. 18 |
| 4,673,424 A | * | 6/1987 | Range ................... | 55/473 |
| 4,749,392 A | * | 6/1988 | Aoki et al. ........... | 55/513 |
| 5,487,768 A | * | 1/1996 | Zytka et al. .......... | 55/385.2 |
| 5,843,196 A | * | 12/1998 | Leavey et al. ........ | 55/385.2 |
| 5,997,397 A | * | 12/1999 | Frickel et al. ........ | 454/57 |
| 6,059,852 A | * | 5/2000 | Olson ................... | 55/500 |
| 6,279,266 B1 | * | 8/2001 | Searcy ................. | 292/38 |
| 6,368,206 B1 | * | 4/2002 | Hunter et al. ........ | 454/57 |

* cited by examiner

Primary Examiner—Duane Smith
Assistant Examiner—Jason M. Greene
(74) Attorney, Agent, or Firm—Volpe and Koenig, P.C.

(57) ABSTRACT

A compact, portable, lightweight, low power consuming, convenient, versatile and sterile laminar airflow device, useful in obtaining a workspace substantially devoid of airborne particulate contaminants, said device having a body (C) divided into an upper and lower chambers; the upper chamber housing one or more pre-filtration members (B), a motor (T) driving a fan (S), and one or more filters (U) located below the motor; and the lower chamber provided with a slideable front panel (M), a removable platform (X) located at the lower portion of the chamber and a perforated plane (N) placed on the removable platform.

39 Claims, 3 Drawing Sheets

STERILE LAMINAR AIRFLOW DEVICE

FIELD OF INVENTION

Figure 1:
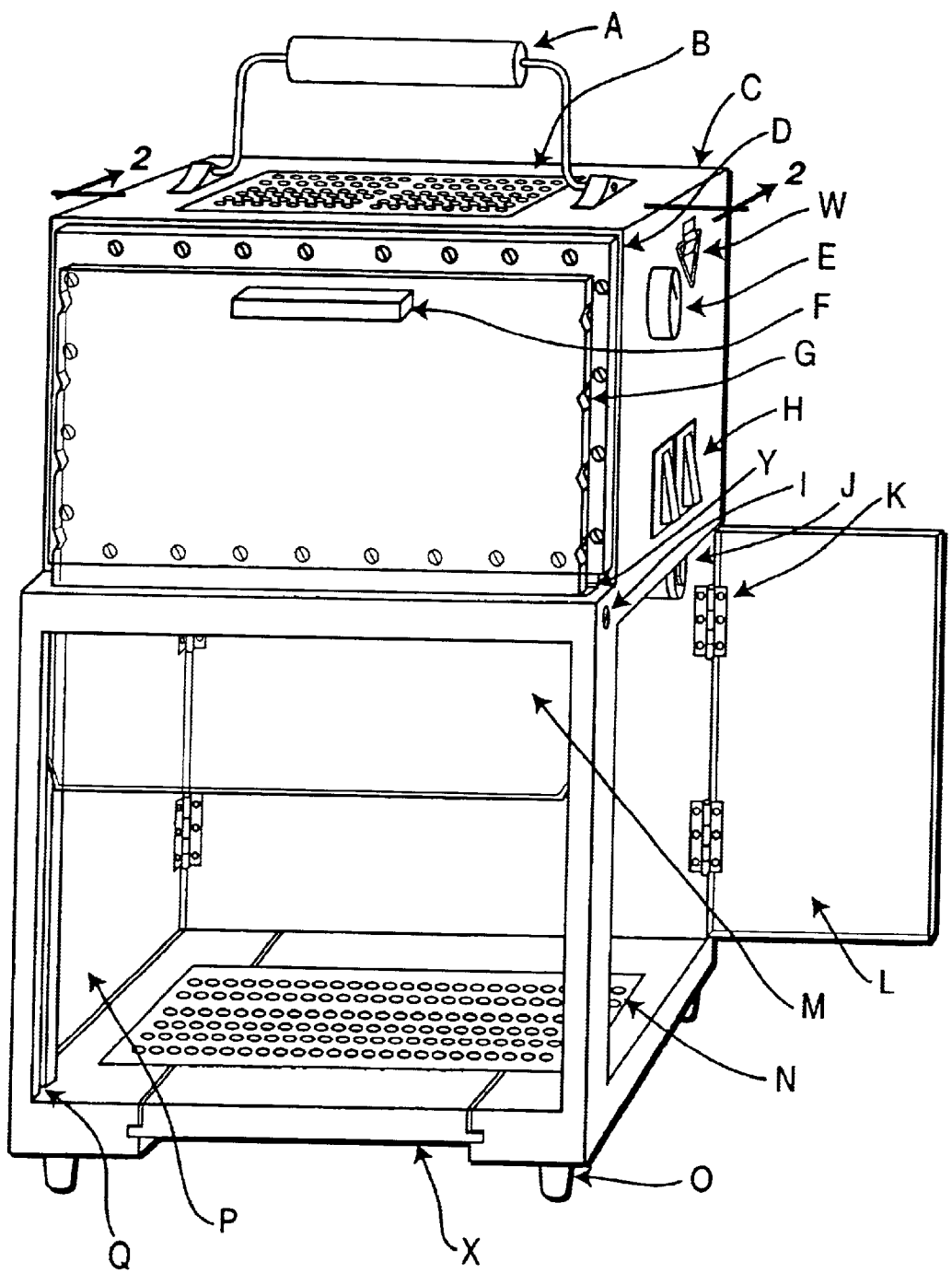
Figure 2:
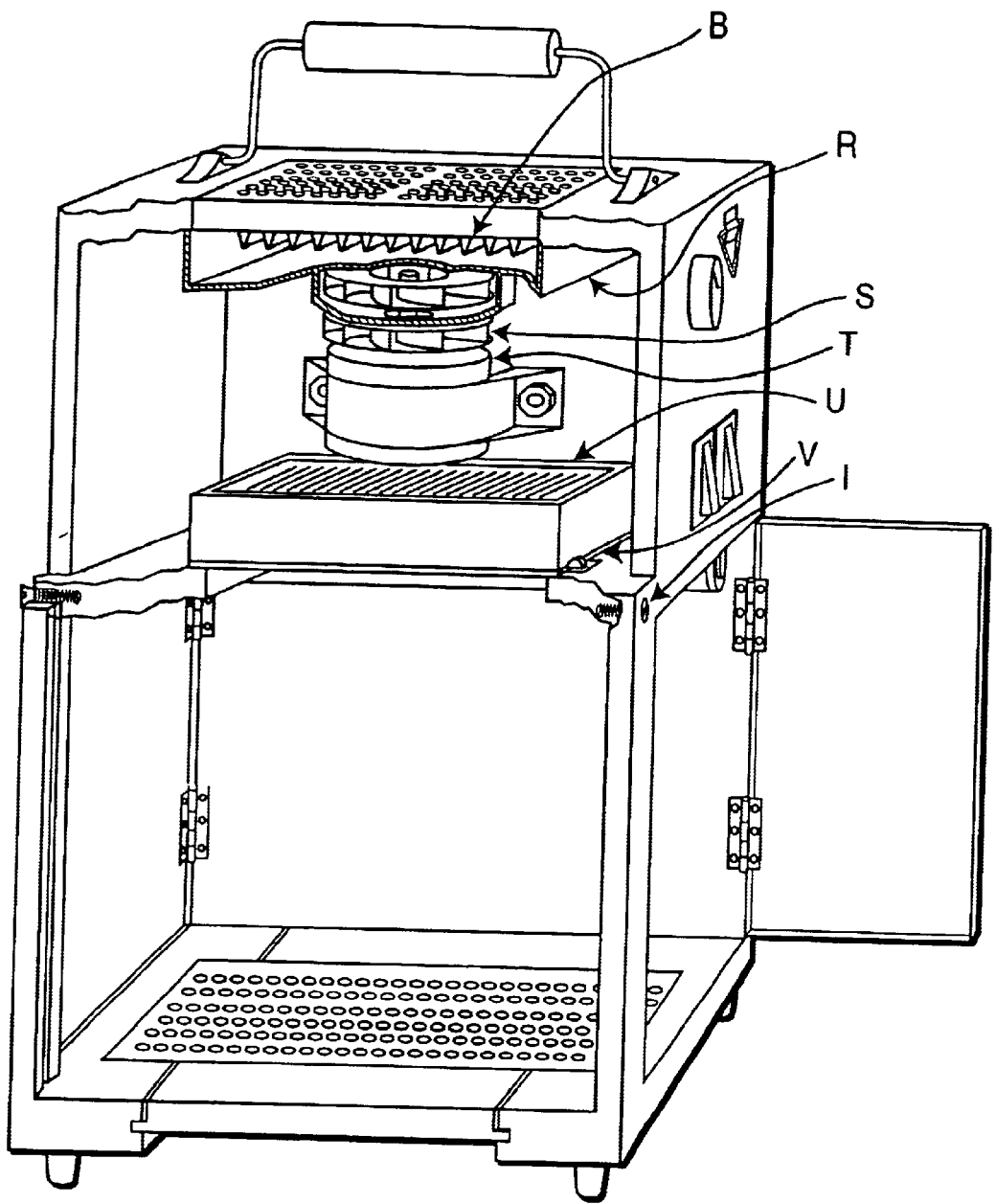
Figure 3:
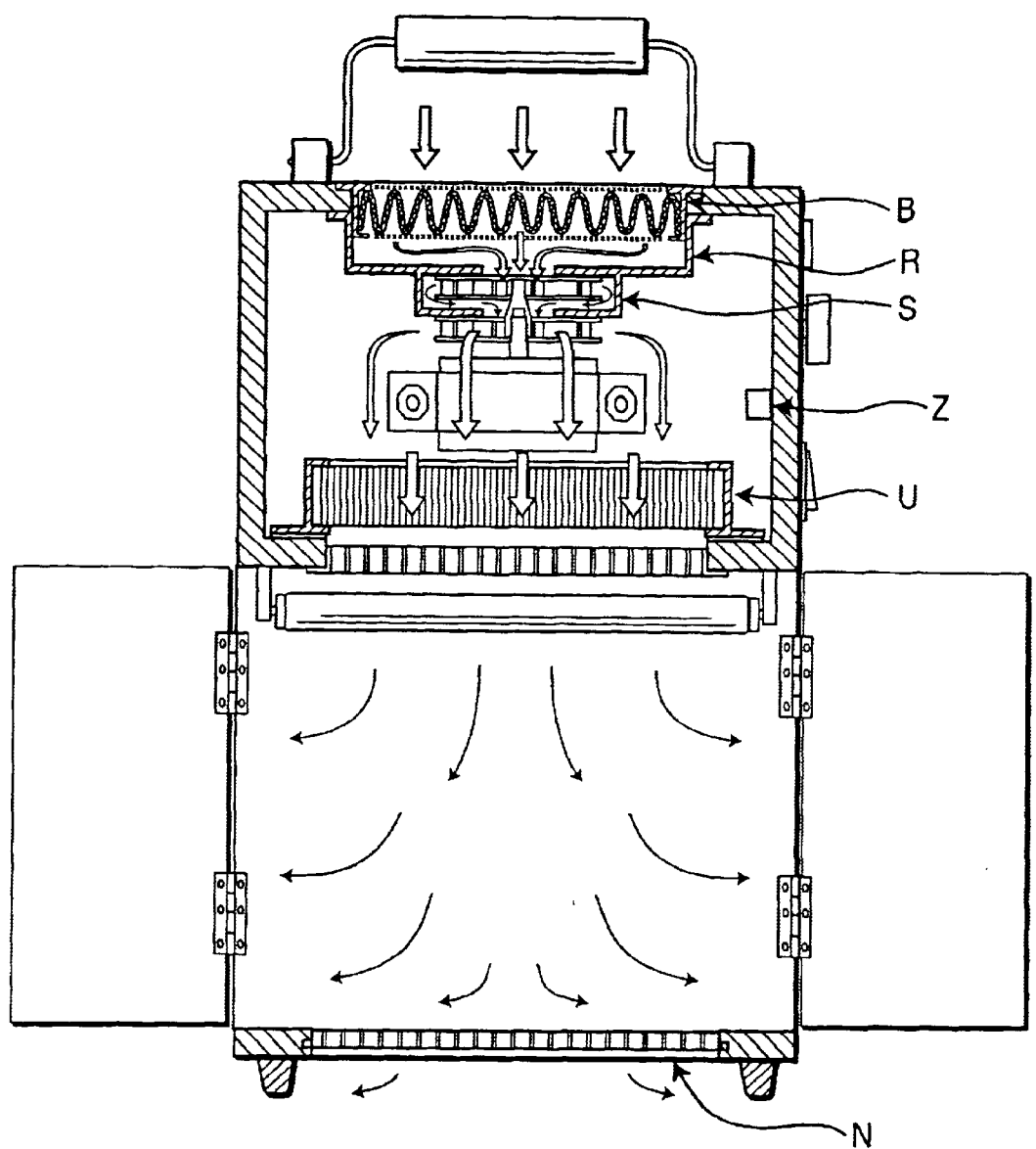

The present invention relates to a compact, portable, lightweight, low power consuming, convenient, versatile and sterile laminar airflow device, useful in obtaining a workspace substantially devoid of airborne particulate contaminants. More particularly, the present invention relates to an apparatus for obtaining a working platform devoid of both biological and a-biological contaminants for tissue culture operations, watch and electronic device assembling, and initiation of aseptic cultures of micro-organisms from field samples 'in situ'.

BACKGROUND OF THE INVENTION

In tissue culture and industries like the electronic industry, watch industry etc., the requirements for a clean area are near absolute and even a small leakage or mishandling can lead to disastrous results in the production line. Such is the essentiality of the clean area or clean benches that a substantial amount of money goes into the erection of these structures and the maintenance of the same. Maintaining these structures is also expensive, leading to an escalation in the ultimate cost of production.

UV cabinets, which are being used for this purpose, have the drawback of limited $O_2$ supply. This leads to restricted use. Also, it may endanger the safety of the user if the sprayed alcohol/rectified spirit inside the chamber does not dry up. Further, these are quite bulky and unsuitable for portability and do not offer flexibility in their usage, e.g. in the electronic industry, as the materials need to be placed well before use.

The horizontal and vertical sterile laminar air flow systems which are also presently being used have the disadvantage of being heavy, bulky, and expensive in terms of cost and maintenance, making them unsuitable for low end applications, where sterile environment is not required intensively, and more often a high infrastructure cost is not warranted, such as micro-electronics works, cottage tissue culture practices, demonstration and teaching in schools; for field activities such as collection of biological samples like microbes and plants from far off places. Field applicability is further limited by the inevitable high power inputs required. At times, it becomes the limiting factor in dissemination of technologies at the grass root levels where these could be more suitable.

It is well known that the hills, because of congenial environmental conditions are very rich in biodiversity that needs to be conserved. Taking plant or microbe samples and bringing them to the base laboratory are always accompanied with dangers of cross contamination leading to spoilage of precious materials and time as well. Therefore, the suitability of a low power consuming, portable, sterile laminar airflow device is highly desirable.

OBJECTS OF THE INVENTION

The main object of the present invention is to provide a compact, lightweight, versatile and convenient sterile airflow device.

Another object of the present invention is to provide a portable sterile laminar airflow cabinet with a working platform providing a sterile environment for carrying out aseptic operations.

Yet another object of the present invention is to provide a light weight, portable, compact, low power consuming sterile laminar air flow cabinet that can be conveniently used in far flung remote areas for 'in situ' aseptic inoculation of biological samples such as plants and microbes for establishment of their cultures.

Still another object of the present invention is to provide a sterile air flow device suitable for integration with other devices that may at times require a sterile environment, such as the workbench of an enlarging device, thus increasing the versatility of applications.

One more object of the present invention is to provide a low cost sterile laminar airflow cabinet for demonstration and teaching purposes.

One another object of the present invention is to provide a low cost sterile laminar airflow cabinet for promotion of plant tissue culture as a cottage industry.

Another object of the present invention is to provide a portable, versatile, convenient sterile air flow device, that is small in size, requires less space and can therefore, be used for desktop sterile air applications.

SUMMARY OF THE INVENTION

The present invention relates to a compact, portable, lightweight, low power consuming, convenient, versatile and sterile laminar airflow device, useful in obtaining a workspace substantially devoid of airborne particulate contaminants.

DETAILED DESCRIPTION OF THE INVENTION

Accordingly, making reference to FIGS. I through III, the present invention provides a sterile laminar airflow device, useful in obtaining a workspace substantially devoid of airborne particulate contaminants, said device comprising a body (C) divided into an upper and lower chambers; the upper chamber housing one or more pre-filtration members (B), a motor (T) mounted with fan (S), one or more HEPA filters (U), which are mounted on a gasket (V); and the lower chamber provided with a front panel (M) and housing a removable platform (X) and a perforated plane (N).

In an embodiment of the present invention, the body is made up of materials selected from the group comprising of solid wood, laminated wood, stainless steel or any other metal sheets and a lightweight high-strength plastic.

In another embodiment of the present invention, the lightweight high-strength plastic is selected from the group comprising of Polycarbonate, fibre-glass and reinforced strengthened glass, acrylic polymethacrylate, polyester, polyethylene, polypropylene and polymethyl pentene (TPX).

In still another embodiment of the present invention, the body has provisions for housing the dust filter, fan and HEPA filters.

In yet another embodiment of the present invention, the length to width ratio of the laminar airflow device is in the range of 3 to 2.

In one more embodiments of the present invention, a twin turbo fan ensures continuous downward movement of sterile air.

In another embodiment of the present invention, the turbo fan is a heavy-duty axial fan.

In an embodiment of the present invention, the front panel is preferably of sliding type.

In another embodiment of the present invention, the front panel has upward and downward restricted movement.

In still another embodiment of the present invention, the front panel can be held at any desired position.

In yet another embodiment of the present invention, the platform is made up of materials selected from the group comprising steel, wood, non-corrosive polyethylic material, non-corrosive polyplast material and non-corrosive metallic material.

In still another embodiment of the present invention, the base of the lower chamber is perforated and with or without provision for removing the central part.

In another embodiment of the present invention, the central part of the perforated platform is made removable by a slit and groove mechanism, enabling integration of the device with other devices that may at times require a sterile environment.

In an embodiment of the present invention, the perforated plate is made up of a non-corrosive material selected from the group comprising metal, synthetic material and wood.

In another embodiment of the present invention, the HEPA-filter opening facing towards the lower chamber is covered with a plastic grill.

The present invention further provides a compact, portable, lightweight, low power consuming, convenient and versatile sterile laminar airflow device, useful in obtaining a workspace substantially devoid of airborne particulate contaminants, said device comprising a body (C) provided with mounts (O) and divided into upper & lower chambers; the upper chamber being provided with a removable panel (D) at the front for access to the internal components, housing a pre-filtration member (B) capable of retaining suspended particles in the air, a motor (T) with a twin turbo fan (S) compartmentalized by a partition (R) into a suction channel for pushing the air entrapped in the pre-filtration member (B) unidirectionally through the air tight exhaust channel and a HEPA filter (U), which is mounted on a leak-proof spongy rubber gasket (V), placed in the path of pressurized air, for further cleansing of the air of any biological or a biological airborne particulate contaminants so as to ensure a continuous flow of sterile air into the lower chamber and upon the removable solid platform (X)/perforated plane (N); switches with indicator lights (H) on a side surface for controlling the operations; a speed controller (E) for regulating fan or motor speed; a large centrally located handle (A) at the top for ease of carrying by a single hand; buckles (W) for attaching standard shoulder straps (not shown for purposes of simplicity); a lower chamber with an assembly for a UV tube (J) with germicidal properties; openable panels (L, P) on opposite sides by hinge joints (K) arranged along a rear vertical axis, and a lower front panel (M) with a height such that at a completely closed position it does not obstruct the removal of the front panel of the upper chamber; openable by sliding movement in a vertical plane along the vertical slot (Q) in the body, through a horizontal slot (Y) at the front above the lower chamber, facilitated by an appropriately placed handle (F) with provision for holding the whole panel at different heights, with the help of notches (G) along the side edges, which are obstructed by the ball, spring and screw system (I) fixed to the body wall; and fibrous mat packing provided in the horizontal slot (Y) to prevent free movement of air and dust particles.

In an embodiment of the present invention, the device is provided with a handle (A) as a carrying device.

In another embodiment of the present invention, the device is provided with buckles (W) on the sides for attachment of shoulder straps.

In still another embodiment of the present invention, the device is provided with an illumination device.

In yet another embodiment of the present invention, the illumination device is selected from the group comprising a tube, bulb and halogen lamp.

In more embodiment of the present invention, the front and side panels may be transparent or opaque.

In another embodiment of the present invention, the front and side panels are made up of unbreakable UV stabilized material.

In another embodiment of the present invention, the front panel is preferably of sliding type.

In another embodiment of the present invention, the front panel has upward and downward restricted movement.

In still another embodiment of the present invention, the front panel can be held at any desired position.

In yet another embodiment of the present invention, the front panel is held at different positions by a screw and spring mechanism.

In one more embodiment of the present invention, the device is provided with removable legs to have clearance above a table.

In another embodiment of the present invention, the device is provided with a UV source.

In an embodiment of the present invention, the UV source is a UV tube.

In another embodiment of the present invention, the UV tube is fixed at a position below the upper chamber.

In still another embodiment of the present invention, a device (Z) for measuring air pressure is installed in the upper chamber.

In yet another embodiment of the present invention, the air pressure-measuring device (Z) monitors and includes means to regulate the inside pressure, and hence the airflow, through HEPA filters.

In one more embodiment of the present invention, the switches control the airflow and light intensities.

In another embodiment of the present invention, the control switch is selected from the group comprising an ON-OFF click type switch, sliding type switch, and dimmer type switch with rotary motion.

In an embodiment of the present invention, the device is provided with a platform with perforations.

In another embodiment of the present invention, the platform is made up of materials selected from the group comprising steel, wood, non-corrosive polyethylic material, non-corrosive polyplast material and non-corrosive metallic material.

In still another embodiment of the present invention, the central part of the perforated platform is made removable by a slit and groove mechanism, enabling integration of the device with other devices that may at times require a sterile environment.

In yet another embodiment of the present invention, the base of the lower chamber is perforated and with or without provision for removing the central part.

In one more embodiment of the present invention, the pre-filter is covered with a perforated plate.

In another embodiment of the present invention, the perforated plate is made up of a non-corrosive material selected from the group comprising metal, synthetic material and wood.

In another embodiment of the present invention, the HEPA-filter opening towards the lower chamber is covered with a plastic grill.

In another embodiment of the present invention, the entire device can be carried in a lightweight box.

In still another embodiment of the present invention, the device can be operated by either an ordinary power supply or a battery.

In yet another embodiment of the present invention, the device can be used as workbench of an enlarging device.

BRIEF DESCRIPTION OF THE ACCOMPANYING DRAWINGS

In the drawings accompanying the specification,

FIG. I is a perspective view of the present device called 'STERIFLOW' embodying the present invention.

In the drawings accompanying the specification,

FIG. II is a perspective view of the vertical section taken on the line 2—2 of FIG. I.

In the drawings accompanying the specification,

FIG. III is a front view of the vertical section taken on the line 2—2 of FIG. I, indicating the direction of the airflow streamlines that would affect particulate trajectories in the STERIFLOW.

Details of the individual parts of the device called 'STERIFLOW' are given below by way of illustration, however, this should not be construed to limit the invention in any manner:

A) Handle: Swing type handle, centrally located at the top of the body such that it does not obstruct the air inlet.

B) Pre-filter: A fibrous washable filter sheet with large pore size and folded setup for high surface area to volume filter to restrict the intake of suspended dust particles.

C) Body: A wooden cabinet 35×25×50 (cm): W×D×H and wall thickness 2 cm provided with rubberized mounts (O) of 2 cm height; and divided into upper & lower chambers; the upper chamber having internal dimensions 31×21×21 (cm): W×D×H, with a removable panel (D) at the front for access to the internal components, housing the filtration member (B) capable of retaining suspended particles in the air, a motor (T) with a twin turbo fan (S) compartmentalized by a partition (R) into a suction channel for pushing the air entrapped in the pre-filtration member (B) unidirectionally through the air tight exhaust channel and the HEPA filter (U), which is mounted on a leak-proof spongy rubber gasket (V), placed in the path of pressurized air, for further cleansing of the air of any biological or a biological air borne particulate contaminants so as to ensure a continuous flow of sterile air into the lower chamber and on the removable solid platform (X)/ perforated plane (N); an air pressure measuring device (Z) in the upper chamber monitors and includes means to regulate inside pressure, and hence the air flow through the HEPA filter, by regulating the speed of fan motor (T), for example; a lower chamber of internal dimensions 35×21×23 (cm): W×D×H, with an assembly for UV tube (J) with germicidal properties, a solid platform (X) and a perforated plane (N); switches with indicator lights (H) on one side surface for controlling the operations; a speed controller (E) for regulating fan or motor speed; a large, centrally located handle (A) at the top for ease of carrying by a single hand, (W) buckles for attaching standard shoulder straps; openable panels (L, P) on opposite sides with hinge joints (K) along the rear vertical axis, and a front panel (M) with height=27 cm so that at closed position it does not obstruct the removal of the front panel of the upper chamber; openable by upward sliding movement in a vertical plane along the vertical slot (Q) in the body, through a horizontal slot (Y) at the front of the body and above the lower chamber, facilitated by an appropriately placed handle (F) with provision for holding the whole panel at different heights, with the help of notches along the side edges (G), which are obstructed by the ball, spring & screw system (I) fixed to the body wall typically referred to as a "click-stop" system; fibrous mat packing fixed to the body, between the front panel of the lower chamber and the boundaries of the horizontal slot above the lower chamber for the vertically slidable front panel to prevent free movement of air.

D) Upper Front Panel: A wooden panel 6 mm in thickness, fixed in front position of the upper chamber with screws, and allowing access to the internal components for servicing.

E) Regulator: An electronic fan regulator with maximum capacity of 600 watts operable at 240V AC, 50 Hz electricity supply, to regulate the speed of the motor, turbo fan and hence, the speed of the sterile air flow.

H) Indicator Switches: Two indicator switches of 6 Amp capacity, operable at 250 V AC, placed on the side of the body (C) to facilitate the switching on and off the motor (T) and the germicidal UV lamp (J).

J) Germicidal UV Lamp: A 'Sankyo Denki', Japan brand, 21 cm long, 6 Watt shortwave UV tube placed at the rear side, below the upper chamber to evenly illuminate the lower chamber and any objects kept on the working platform (N).

M) Lower Front Panel: 4 mm thick rectangular UV stabilized transparent polycarbonate plate of dimensions 32×27 (cm): W×H, the left and right margins of which are notched (G) at regular intervals, which, when obstructed by the ball, spring & screw system (I), provide a mechanism of holding it at desired heights. The lower edge is partially trimmed in an oblique manner to avoid obstruction by the ball, spring screw system (I) during the initial insertion into the body (C). The shape and size are such that upon complete closure it does not obstruct with the removal of the upper front panel (D). A handle (F) fixed to the panel is a convenient means for gripping with hand, to facilitate its vertical movement.

N) Perforated Plate: A removable stainless steel perforated plate, with such shape that it fits well into the working platform (X). The perforations facilitate partial vertically downward flow of the sterile air. The perforated plate can be replaced by a solid plate made of laminated wood, glass, stainless steel or any other non-corrosive material as desired but not limited to them.

O) Rubberized legs: 2 cm tall rubberized legs that keep the working platform (X) raised above the surface, thus allowing air passage from beneath the working platform. It also dampens the vibrations in the body due to activity of the motor (T), resulting in a smoother operation.

S) Twin turbo fan: A pair of turbo fans are provided to minimize any recirculation of air due to leakage from the exhaust channel to the suction channel, and to maximize the unidirectional flow of air so as to build up higher pressures required to drive the air through the HEPA filter.

T) Motor: The fan motor has the following specifications: (i) Power: 200 Watts, (0.003 units/minute); (ii) Operation voltage: 230V AC, 50 Hz; (iii) Current: 0.95 Amp; (iv) Suction strength: 650 mm water column; and (v) Speed: 15500~16000 rpm U) HEPA filter: A setup of high surface area folded filter membrane with a cut off pore size of 0.2 microns located at the end of the exhaust channel in the upper chamber, upon passing through which the air pressurized by the motor and twin turbo fan generates a vertically downwards stream of sterile air into the lower chamber hence, creating a sterile environment above the working platform (X).

V) Spongy rubber strip: A strip of spongy rubber is sandwiched along the circumference of the HEPA module, between the HEPA module and the lower wall of the upper chamber of the body (C) to which the HEPA module is fixed, to avoid any air leakage from the upper chamber into the lower chamber except through the HEPA filter.

The working of the sterile air flow device STERIFLOW for obtaining a continuous flow of clean air at the perforated bench area is described below:

The STERIFLOW is switched on so that the air is sucked into the upper chamber because of the fan and is filtered through the pre-filter (B) which retains dust particles. Soon the pressure builds up within the upper chamber and the air is then forced through the HEPA filter which takes care of any remaining suspended particles, both biological and a biological, so that clean air flows in a continuous stream across the filter and onto the working area which also gets cleared of any suspended particles after 10–12 minutes and can be used for sterile operations. In case of biological operations, the use of UV light for at least 10 minutes is recommended to kill already existing contaminants. A spirit lamp or a gas burner to flame sterilize the mouths of the culture vessels before carrying out operations involving live biological material can also be used.

The following examples are given by way of illustration of the utility of the present invention (STERIFLOW) for raising aseptic cultures and should not be construed to limit the scope of the present invention.

EXAMPLE-1

In this example, pre-sterilized petriplates were first kept in the working platform along the arms of a cross stretching across the corners of the working platform for 10 minutes with UV light on and then, when still hot, sterilized liquid MS medium containing sucrose (30% w/v), vitamins and agar for solidification, was poured into them and allowed to solidify for 15 minutes. The petriplates were then sealed with parafilm (M/s Sigma, USA) and incubated to check for any contamination for 3 weeks. No contamination in these petriplates confirmed the proper working of the present invention.

EXAMPLE-2

The STERIFLOW as shown in FIG. I was used for raising the aseptic cultures of the nodal explants of a bamboo (*Dendrocalamus hamiltonii*). The nodal explants after surface sterilization with 0.04% solution of $HgCl_2$ (w/v) containing a drop of liquid detergent were transferred on to a modified Murashige and Skoog (1962) medium containing a cytokinin, benzyl adenine and an auxin, 2,4-dichlorophenoxy acetic acid (2,4-D; 1.0 mg/l each). There was no contamination because of any bacteria or fungi even after three weeks of incubation period, affirming that the STERIFLOW is working in the desirable manner.

Main Advantages of the Present Invention are:

The present invention is a low power consuming, portable, versatile, convenient device capable of providing continuous flow of clean air on a working platform making it suitable for all industries requiring clean areas at the working benches.

It provides a lightweight, portable, compact, low energy consuming sterile laminar air flow cabinet that can be conveniently used in far flung remote areas for 'in situ' aseptic inoculation of biological samples such as plants and microbes for establishment of cultures.

Provision of a large handle for carrying and buckles for attaching flexible shoulder belts, in addition to the small compact size and light weight, make the device truly portable.

It is a low cost sterile laminar air flow cabinet for promotion of plant tissue culture as a cottage industry, demonstration and education in schools and colleges, and for industries with low end cost requirement such as the watch industry and the micro-electronics industry.

It being small in size, requires less space and can therefore, be used for desktop sterile air applications.

The working platform being partially removable, the device can be integrated with other devices that may at times require sterile environment, such as the workbench of an image enlarging device, thus increasing the versatility of applications.

Provision for opening or closing the front and the side panels, make manipulation inside the sterile zone within the lower chamber possible from any direction as per convenience.

Maintenance is negligible as except for the HEPA filters, the rest of the items are available easily in the market.

What is claimed is:

1. A sterile laminar airflow device useful in obtaining a workspace substantially devoid of airborne particulate contaminants, said device comprising a hollow body divided into an upper chamber and a lower chamber separated from the upper chamber by a filter; the upper chamber having at least one pre-filtration member mounted thereon, a motor mounted inside the upper chamber between a top face and the filter, a fan driven by the motor for creating a flow of air going into the upper chamber through the pre-filtration member and out of the upper chamber into the lower chamber through the filter; and the lower chamber provided with a selectively openable front panel having adjustment members to secure the lower front panel in a variety of positions allowing selective adjustment of a width of an aperture of the lower chamber, whereby the aperture provides access to the lower chamber, a removable platform located on a base face of the lower chamber and a perforated plane located on the removable platform inside the lower chamber, wherein the air flow exits the lower chamber through the perforated plane.

2. A device as claimed in claim 1, further comprising removable legs or mounts (O) for providing clearance from any surface on which the device is placed.

3. A device as claimed in claim 1, wherein the fan is compartmentalized by a partition which creates a closed path between the pre-filtration member and the fan whereby a suction channel is formed through the pre-filter and the filter for pushing the flow of air unidirectionally into the lower chamber.

4. A device as claimed in claim 1, further comprising one or more switches on at least one outer surface of the body for controlling operations; a speed controller for regulating fan or motor speed; an illuminating device; and a UV source with germicidal properties being provided in the lower chamber.

5. A device as claimed in claim 1, further comprising panels arranged on sides of the body, swingably mounted on hinge joints arranged along a rear vertical axis, a handle, attached to the front panel, positioned so that at a completely closed position the handle does not obstruct removal of a removable panel of the upper chamber; a vertical groove, and a horizontal slot enabling movement of the front panel toward the upper chamber, and wherein the adjustment members include notches on at least one side of the front panel and a spring and screw mechanism along an inner surface of the vertical groove cooperating with said notches to hold the front panel in different positions.

6. A device as claimed in claim 1, wherein a large centrally located handle is mounted on an outer top portion of the upper chamber for moving the device.

7. A device as claimed in claim 4, wherein the UV source is a UV tube.

8. A device as claimed in claim 4, wherein the illuminating device is selected from the group consisting of a tube, bulb and halogen lamp.

9. A device as claimed in claim 1, wherein the body is formed of materials selected from the group consisting of solid wood, laminated wood, stainless steel, carbon steel, and plastic.

10. A device as claimed in claim 9, wherein the plastic is selected from the group consisting of Polycarbonate, fibreglass and reinforced strengthened glass, acrylic, polymethacrylate, polyester, polyethylene, polypropylene and polymethyl pentene (TPX).

11. A device as claimed in claim 1, wherein a ratio defined by the distance between the top face and the base face, over the distance between opposing first and second side faces which connect with ends of the top face and extend perpendicular to the top face and the front panel, is approximately 3:2.

12. A device as claimed in claim 1, wherein the fan is a twin turbo fan which ensures continuous downward movement of sterile air.

13. A device as claimed in claim 1, wherein the fan is a heavy-duty axial fan.

14. A portable, sterile laminar airflow device, that can be carried by a user, useful in obtaining a workspace substantially devoid of airborne particulate contaminants, said device comprising a body provided with mounts and divided into upper and lower chambers; the upper chamber having a removable panel at a front of the body for gaining access inside the upper chamber, said upper chamber further having a pre-filtration member capable of retaining suspended particles in the air, a motor driving a twin turbo fan for creating a flow of air, the motor being compartmentalized by a partition which creates a closed path between the pre-filtration member and the fan wherein a suction channel is created for pushing the flow of air through the pre-filtration member, then unidirectionally through an exit of the partition, and through a HEPA filter separating the upper and lower chambers, the HEPA filter being mounted on a leak proof spongy rubber gasket and placed in the path of the flow of air, whereby the flow of air must pass through the HEPA filter to enter the lower chamber for further cleansing of the flow of air of any biological or a biological airborne particulate contaminants to ensure the flow of air into the lower chamber is sterile; the lower chamber having a removable solid platform, located on a base face of the lower chamber opposite the HEPA filter, a perforated plane mounted on the platform inside the lower chamber between the platform and the HEPA filter; the device further comprising a speed controller for regulating fan speed; a handle centrally located at a top of the body for ease of carrying; a UV source with germicidal properties mounted inside the lower chamber; openable side panels arranged on two opposing sides of the lower chamber and swingably mounted about hinge joints mounted on a rear panel of the lower chamber orthogonal to the side panels, and an openable lower front panel, orthogonal to the side panels and opposite the rear panel, slideable, within a plurality of grooves in the lower chamber, toward the upper chamber, through a horizontal slot in the lower chamber, allowing access to the lower chamber, the lower front panel including a handle, for sliding the lower front panel, and a plurality of notches, located on opposing side ends of the lower front panel which cooperate with a ball, spring and screw system fixed to the body for selectively releasably securing the front panel in various different positions to adjust a dimension of an opening of the lower chamber; the device further comprising a fibrous mat packing provided in the horizontal slot to prevent free movement of air and dust particles.

15. A device as claimed in claim 14, wherein the device is provided with an illumination device.

16. A device as claimed in claim 15, wherein the illumination device is selected from the group consisting of a tube, bulb and halogen lamp.

17. A device as claimed in claim 14, wherein the lower front and side panels may be one of transparent and opaque.

18. A device as claimed in claim 14, wherein the lower front and side panels are formed of shatter resistant UV stabilized material.

19. A device as claimed in claim 14, wherein the lower front panel is arranged for upward and downward movement.

20. A device as claimed in claim 14, wherein the body is provided with removable legs to provide clearance for exiting air from the lower chamber.

21. A device as claimed in claim 14, further comprising an air pressure measuring device installed in the upper chamber for monitoring an inside air pressure, the air pressure measuring device including means for regulating the inside pressure, thereby regulating the air flow through the HEPA filter.

22. A device as claimed in claim 14, further comprising a plurality of switches for controlling the flow of air and light intensities.

23. A device as claimed in claim 22, wherein the switches are selected from the group consisting of an ON-OFF click switch, sliding switch, and dimmer switch with rotary motion.

24. A device as claimed in claim 14, wherein the device is provided with a perforated platform arranged at a base of the body.

25. A device as claimed in claim 14, wherein the platform is made up of materials selected from the group consisting of steel, wood, non-corrosive polyethylic material, non-corrosive polyplast material and non-corrosive metallic material.

26. A device as claimed in claim 14, wherein a central part of the perforated platform is made removable by a slit and groove mechanism, enabling integration of the device with other devices that may at times require sterile environment.

27. A device as claimed in claim 14, wherein a base of the lower chamber is perforated and with or without provision for removing a central part of the base.

28. A device as claimed in claim 14, wherein the prefiltration member is covered with a perforated plate.

29. A device as claimed in claim 28, wherein the perforated plate is formed of a non-corrosive material selected from the group consisting of metal, synthetic material and wood.

30. A device as claimed in claim 14, wherein the HEPA filter is covered with a plastic grill.

31. A device as claimed in claim 14, further comprising a box for housing and carrying the device.

32. A device as claimed in claim 14, wherein the device can be operated on a battery.

33. A device as claimed in claim 14, wherein the device can be used as a workbench of an enlarging device.

34. The device as claimed in claim 14, further comprising a plurality of buckles attached to the device to secure a strap for carrying the device.

35. The device as claimed in claim 1, further comprising a plurality of buckles attached to the device to secure a strap for carrying the device.

36. A portable laminar air flow device for creating a workspace substantially free of airborne contaminates comprising:
   an upper chamber having an upper interior space and a removable upper front panel for accessing the upper interior space;
   a motor, mounted within the upper interior space on an interior wall;
   a fan, mounted on the motor, to create a flow of air;
   a prefiltration member sealably mounted to the upper chamber for allowing the flow of air to enter the upper chamber through the prefiltration member;
   a lower chamber, having a lower interior space, connected to an open bottom face of the upper chamber;
   a filter, sealably mounted to the open bottom face, for allowing the flow of air to enter the lower chamber through the filter; and,
   a lower front panel, selectively slideably mounted on a front face of the lower chamber substantially orthogonal to the open bottom face, having adjustment members to secure the lower front panel in a variety of positions allowing selective adjustment of a width of an aperture of the front face, whereby the aperture provides access to the lower interior space and allows the flow of air to exit the lower chamber therethrough.

37. The device according to claim 36, further comprising at least one side panel, hingedly mounted on at least one side face of the lower chamber substantially orthogonal to the front face to provide access to the lower interior space.

38. The device according to claim 36, further comprising a carrying handle mounted to the upper chamber for carrying the device.

39. The device according to claim 36, further comprising a plurality of buckles attached to the device to secure a strap for carrying the device.

* * * * *

UNITED STATES PATENT AND TRADEMARK OFFICE
CERTIFICATE OF CORRECTION

| | |
|---|---|
| PATENT NO. | : 6,623,538 B2 |
| APPLICATION NO. | : 09/884603 |
| DATED | : September 23, 2003 |
| INVENTOR(S) | : Thakur et al. |

It is certified that error appears in the above-identified patent and that said Letters Patent is hereby corrected as shown below:

IN THE SPECIFICATION:

Column 3, line 38 "a biological" should read "abiological";
Column 5, lines 48-49, "a biological" should read "abiological";
Column 7, lines 29-30, "a biological" should read "abiological"--

IN THE CLAIMS:

Column 9, line 64, "a biological" should read "abiological".--

Signed and Sealed this

Twenty-fourth Day of October, 2006

JON W. DUDAS
*Director of the United States Patent and Trademark Office*